June 6, 1950      E. B. DEWEY      2,510,805
EXTENSIBLE TIP FOR DIVIDERS
Filed May 31, 1945
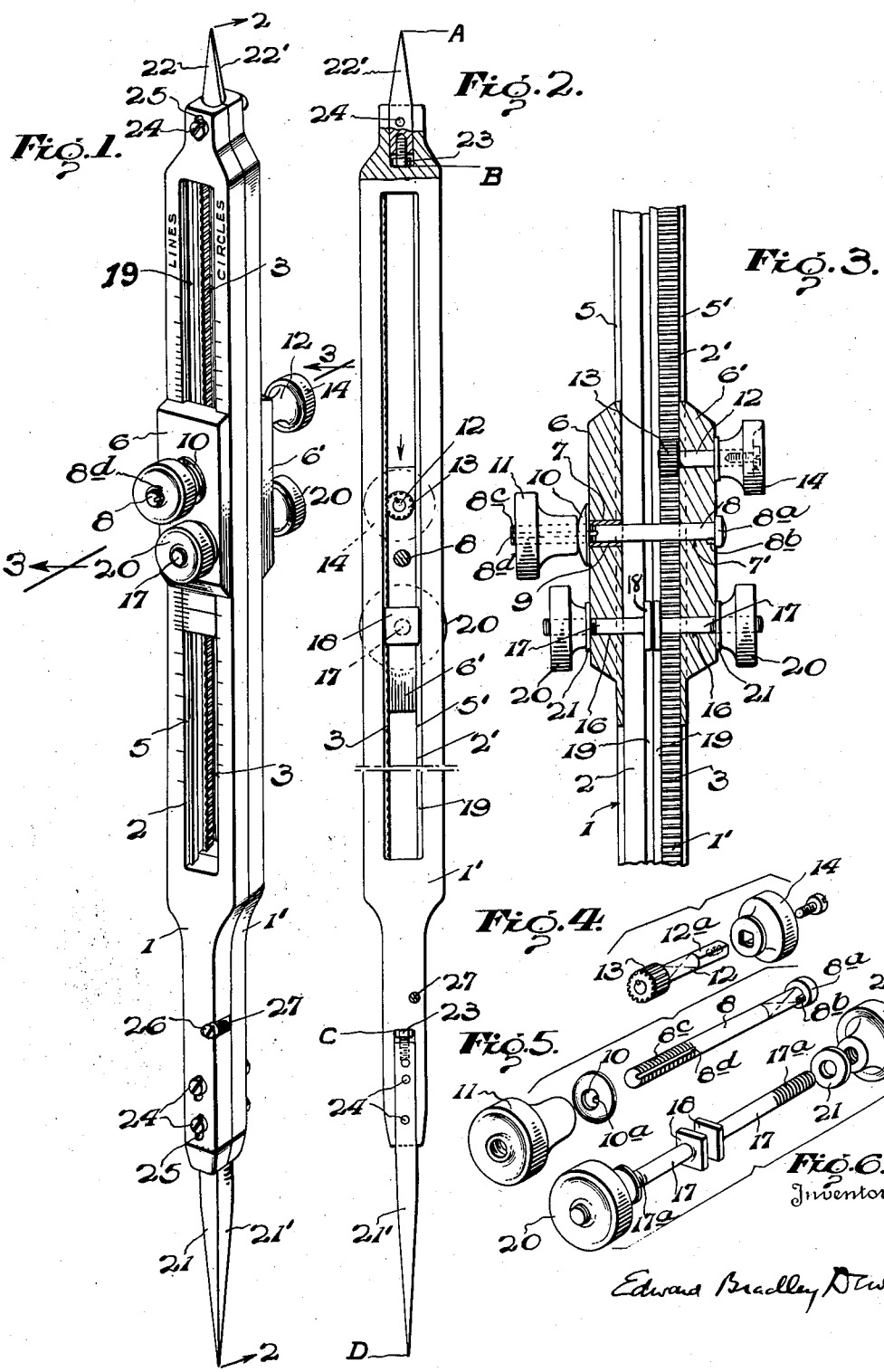
Inventor
Edward Bradley Dewey Patented June 6, 1950

2,510,805

UNITED STATES PATENT OFFICE 2,510,805

EXTENSIBLE TIP FOR DIVIDERS

Edward Bradley Dewey, Washington, D. C.

Application May 31, 1945, Serial No. 596,878

2 Claims. (Cl. 33—152)

My invention relates to improvements in proportional dividers graduated for lines, circles, planes and solids in the usual way, particularly in the manner in which the legs are pivoted, so that once the correct proportional setting is made the pivot can be locked securely in such position and will not slip out of adjustment during constant use. The present invention is an improvement over that disclosed in my prior abandoned application Serial No. 522,340 filed February 14, 1944.

Another improvement is in the adjustable points by which wear caused by sharpening of the points may be compensated for, utilizing hexagonal headed screws set in the inner ends of the points, which screws can be rotated to readjust the lengths of the points to their original lengths.

Other objects and advantages of my invention will appear from the following description and accompanying drawing in which similar numerals refer to similar parts in the several views.

Fig. 1 is a perspective view of my proportional dividers in the closed position.

Fig. 2 is a section on line 2—2 of Fig. 1.

Fig. 3 is a section looking in the direction of arrows 3—3, Fig. 1.

Figs. 4, 5 and 6 are expanded perspective views of three shafts and knobs for respectively adjusting and locking the legs in their proportional setting while permitting pivoting of the legs.

In the accompanying drawing, I and I' represent the legs of the dividers, which are preferably pointed at both ends and slotted longitudinally at 2 and 2', slot 2' having on one side a rock 3. Both slots 2 and 2' are recessed on their outer edges as shown at 5 and 5' to receive sliding blocks 6 and 6' which are bored at 7 and 7' to receive a shaft 8 (Fig. 5) passing through the bores 7—7' and through the slots 2—2', said shaft 8 forming the pivot of the legs I—I' of the dividers.

As shown in Fig. 3, the shaft 8 has a head 8a overlying the face of the block 6', the head being provided with an integral spline 8b which is preferably engaged in a slot in the wall of bore 7' to maintain the shaft 8 against rotation. Within the bore 7 of block 6 is a bushing 9 which is preferably replaceable, the bushing forming a supporting bearing for the adjacent end of shaft 8. Shaft 8 is threaded as at 8c (Fig. 5) beyond the bushing 9 and is provided with a longitudinally disposed groove 8d (Fig. 5). A washer 10, which is preferably cup-shaped so as to be resilient, is placed over the end of shaft 8 beyond the outer face of sliding block 6, the bore of washer 10 having an inwardly projecting lug 10a (Fig. 5) slidably fitting the groove 8d of shaft 8 so as to prevent washer 10 from rotating upon shaft 8. A knurled hand nut 11 is threaded onto the end of shaft 8 with its inner end engaging the resilient washer 10, whereby when knurled nut 11 is screwed tightly in place the legs I—I' will be permitted to pivot upon the shaft 8 without affecting nut 11.

In order to shift the sliding block assembly 6—6' axially of the legs of the divider, I provide a shaft 12 (Fig. 3) journaled in a bore in sliding block 6', said shaft carrying on its inner end a pinion 13 meshing directly with the rack teeth 3 of the leg I', said shaft 12 having its outer end non-circular, as at 12a (Fig. 4), to receive the correspondingly shaped bore of a knurled knob 14 whereby when the knob is rotated the gear 13 will be rotated and the sliding block assembly 6—6' will be shifted longitudinally of the legs I—I'.

In order to lock the sliding block assembly 6—6' to their respective legs I—I', each block 6—6' is provided with a bore 16, said bores being in alignment as shown in Fig. 3 and adapted to receive bolts 17 (Fig. 6) having rectangular heads 18 on their inner ends slidably fitting grooves 19 in the inner side edges of the slots 2—2' of the legs, the heads 18 seating in the sides of the grooves 19 and preventing withdrawal of the bolts 17 through the bores 16. The outer end of each bolt 17 is threaded as at 17a to receive a knurled thumb nut 20 adapted to engage a washer 21 contacting the outer faces of the blocks 6 or 6'.

By the above construction, when the nuts 20 and 11 are loosened, the sliding block assembly 6—6' connected together by the shaft 8 passing through slots 2—2' may be shifted longitudinally of the divider legs to the desired location by rotating the nut 14 to revolve pinion 13. After being adjusted to proper position the nut 11 and the two nuts 20 are tightened to bind the blocks 6—6' to their respective legs I—I', thus preventing shifting of the block assembly 6—6' with respect to the legs but permitting the legs to pivot and thus assume various angularities with respect to each other, the proportional setting of the dividers being maintained constant until the thumb nuts 20 and 11 have again been loosened and the sliding block assembly shifted.

The points 21—21' and 22—22' carry at their inner ends small hexagonal headed set screws 23 (Fig. 2) axially mounted in tapped bores in the ends of the points whereby the points may be adjusted outwardly of their guide slots in the legs 1—1' to compensate for the change of length due to sharpening of the points, thereby maintaining the distances A—B and C—D (Fig. 2) constant in relation to the overall length of the legs 1—1' and in relation to the line and circle graduations (Fig. 1) on the said legs. Preferably the heads of screws 23 are polygonal in shape so that one flattened face thereof will engage the bottom of the guide slots to prevent the screws 23 from rotating. Points 21—21' and 22—22' are thus slidable in their slots in the legs 1—1' and are held in adjusted position by set screws 24 passing through elongated slots 25 in the legs 1—1' as shown in Figs. 1 and 2.

In order to normally maintain the legs 1—1' in proper overlapping relation while adjusting the slidable blocks 6—6', I preferably provide a slot 26 in one leg such as 1 (Fig. 1), said slot being of substantially semi-circular shape and extending inwardly from one side edge of the leg, said slot 26 being adapted to receive a stud or pin 27 mounted on the opposite leg 1' and adapted to fill the slot 26 when the dividers are closed, as in Fig. 1, the engagement of pin 27 in the slot preventing axial movement of one leg with respect to the other while the sliding block assembly 6—6' is being adjusted.

I do not limit my invention to the exact form shown in the drawing, for obviously changes may be made therein within the scope of the claims.

I claim:

1. In a proportional divider, a pair of legs pivotally connected together, said legs having elongated guide slots at their ends; adjustable points slidably engaging said slots; means for retaining the points in said slots; and means for adjusting the points longitudinally of said slots, said adjusting means comprising screws carried in threaded bores in the inner ends of the points, said screws having heads engaging the inner ends of the slots.

2. In a proportional divider, a pair of legs pivotally connected together, said legs having elongated guide slots at their ends; adjustable points slidably engaging said slots; means for retaining the points in said slots; and means for adjusting the points longitudinally of said slots said adjusting means comprising screws carried in threaded bores in the inner ends of the points, said screws having heads engaging the inner ends of the slots; said heads being polygonal in shape and the flattened sides thereof engaging the bottoms of the slots.

EDWARD BRADLEY DEWEY.

REFERENCES CITED

The following references are of record in the file of this patent:

UNITED STATES PATENTS

| Number | Name | Date |
|---|---|---|
| 75,827 | Atkins | Mar. 24, 1868 |
| 283,907 | Low | Aug. 28, 1883 |
| 672,424 | Starrett | Apr. 16, 1901 |
| 741,425 | Wild | Oct. 13, 1903 |
| 808,644 | Eichmuller | Jan. 2, 1906 |
| 898,565 | Duncan | Sept. 15, 1908 |
| 1,133,587 | Stenerson | Mar. 30, 1915 |
| 1,210,557 | Stanbery | Jan. 2, 1917 |
| 1,414,484 | Olsen | May 2, 1922 |
| 1,901,801 | Cattaneo | Mar. 14, 1933 |

FOREIGN PATENTS

| Number | Country | Date |
|---|---|---|
| 4,163 | Great Britain | Mar. 17, 1888 |
| 202,134 | Germany | Sept. 26, 1908 |
| 406,595 | Great Britain | Mar. 1, 1934 |